US008521567B2

(12) United States Patent
Varanasi et al.

(10) Patent No.: US 8,521,567 B2
(45) Date of Patent: Aug. 27, 2013

(54) INSURANCE EXCHANGE

(75) Inventors: Radhavenkata Krishna Murthy Varanasi, Hyderabad (IN); Ravikumar Gananath Shenoy Kumble, Hyderabad (IN); Hetash Bipin Master, Mumbai (IN); Harish Jethani, Jaipur (IN)

(73) Assignees: Radhavenkata Krishna Murthy Varanasi, Hyderabad (IN); Ravikumar Gananath Shenoy Kumble, Hyderabad (IN); Hetash Bipin Master, Mumbai (IN); Harish Jethani, Jaipur (IN); Rajsekhar Allada, Norwalk, CT (US)

( * ) Notice: Subject to any disclaimer, the term of this patent is extended or adjusted under 35 U.S.C. 154(b) by 0 days.

(21) Appl. No.: 13/179,349

(22) Filed: Jul. 8, 2011

(65) Prior Publication Data

US 2012/0284058 A1 Nov. 8, 2012

(30) Foreign Application Priority Data

May 6, 2011 (IN) .......................... 1418/MUM/2011

(51) Int. Cl.
*G06Q 10/00* (2012.01)
(52) U.S. Cl.
USPC .............................................. 705/4; 705/1.1
(58) Field of Classification Search
USPC ....................................................... 705/4, 35
See application file for complete search history.

(56) References Cited

U.S. PATENT DOCUMENTS

| 7,933,787 B1* | 4/2011 | Betz et al. ........................... 705/4 |
| 2002/0120476 A1* | 8/2002 | Labelle et al. ..................... 705/4 |
| 2002/0194033 A1* | 12/2002 | Huff .................................. 705/4 |
| 2007/0106540 A1* | 5/2007 | Kovalcik ........................... 705/4 |
| 2008/0288301 A1* | 11/2008 | Emling et al. ..................... 705/4 |
| 2010/0036686 A1* | 2/2010 | Olivier et al. ..................... 705/4 |
| 2010/0228573 A1* | 9/2010 | Quinlan et al. ................... 705/4 |
| 2010/0324942 A1* | 12/2010 | Rogers et al. ..................... 705/4 |
| 2011/0145019 A1* | 6/2011 | Rehor et al. ...................... 705/4 |
| 2012/0022894 A1* | 1/2012 | McLaughlin et al. ............ 705/4 |

OTHER PUBLICATIONS

Get Flexible Geier, Robert. Best's Review 107. 10 (Feb. 2007): 77-79.*
Collaboration from ashes of Kinnect Annesley, Christian. Computer Weekly (Jul. 11, 2006): 10.*

* cited by examiner

*Primary Examiner* — William Rankins
(74) *Attorney, Agent, or Firm* — Osha Liang LLP (57) ABSTRACT

An insurance exchange for providing a neutral, unbiased and automated lead generating platform for interaction, relating to insurance products and services, between a set of users and a set of providers. The system integrates the processes involved in an insurance lifecycle including quote management, endorsement and claims assistance using a single unique code. The unique code captures minute details of the insurance product's lifecycle which can be tracked and retrieved for processing requisitions at any stage of the insurance lifecycle by the system. Moreover, the system gives a user the flexibility to use/enroll to the system at any time within the life of purchased Insurance product. Thus, the insurance exchange is a one-stop shop for a user for any insurance stream including life, non-life, takaful or micro to compare benefits and prices, choose and avail any insurance product or service and also to redress his grievances.

18 Claims, 2 Drawing Sheets

INSURANCE EXCHANGE

FIELD OF THE INVENTION

The present invention relates to the field of insurance.

BACKGROUND OF INVENTION

Insurance is the transfer of risk of loss from one entity to another in exchange of a premium. The first written insurance policy was the "Hammurabi Code". The "Hammurabi Code" offered basic insurance in which a debtor did not have to pay back his loans if he faced some personal catastrophe like disability, death or flooding. The code of Hammurabi also provided financial insurance in which, if a merchant received a loan to fund his shipment, he paid the lender an additional sum in exchange for the lender's guarantee to cancel the loan if the shipment was stolen.

Insurance was also seen in the form of 'general average' where the merchants of Rhodes whose goods were to be shipped together paid a proportionally divided premium which used to be reimbursed to any merchant whose goods were jettisoned during storm or sinkage. The Achaemenian monarchs were the first to have the insurance registered. The registered insurance provided aid, in case, the insurance holder was in trouble or wanted to construct a building, to set up a feast, to have his children married.

The origin of health and life insurance in 600 AD was introduced by Romans and Greeks when they organized "benevolent societies" which cared for the families and paid funeral expenses of members upon death.

Insurance as we know it today can be traced to the Great Fire of London, which demolished 13,200 houses. In reaction to this event, Nicholas Barbon started insurance for buildings. In 1680, he established England's first fire insurance company, "The Fire Office," to insure brick and frame homes. The first insurance company in the United States underwrote fire insurance and was formed in Charles Town, S.C., in 1732.

Today, insurance is a full-fledged industry. The insurance companies collect premium from policy holders, invest the money and reimburse it when the policy holder passes away or when the policy matures. There are different types of insurance policies available today and these can be classified into three major types:
  Life Insurance: Provides a life cover. Money is reimbursed when the person ceases or when the policy matures.
  Health Insurance: Provides reimbursement of medical bills and hospitalization charges.
  Liability Insurance: Includes all other types of insurance including motor, property and professional/business mishaps.

Currently the insurance can be classified into following categories:
  Life Insurance: Insures life of the user through various products mainly term plans, endowment plan and unit linked plan which has various investment options.
  General insurance: This has got various products which insure assets to liabilities of the user. It contains products like Fire, burglary, Health, motor, engineering, aviation, liability, life and many more. Here insurer accepts the risk for a particular period, usually for a year and collects the premium in advance for the same and in case of loss is due to the covered perils then the claim is paid to the user.

Currently, insurers sell life insurance policies linked to investments like mutual funds which provide greater return on investment and also provide tax saving benefits.

Insurance companies cater to needs of policy holders by offering protection through various products which fall in life, health and liability insurance categories. Typically, a policy holder will invest in at least two to three products of a company for instance life insurance, motor insurance and property insurance. Keeping track of the premium due dates and maturity dates of policies to prevent the money from lapsing is a challenging task for policy holders. The task gets all the more difficult when policy holders have to accumulate funds at the last minute to prevent the expiration of the policy.

Also, with the volatile market the policy holders constantly need updates on the NAV (net asset values) for the particular policy, they also need to be notified of launch of new policies or change in existing policies. In addition, policy holders also expect quick redress of their queries from customer care executives. If, policy holders have multiple products from different insurance companies it gets inconvenient for policy holders to wait in different queues and/or dial different telephone numbers for customer support for their diverse insurance products.

Presently, customer care executives are to be contacted for any amendments or for cancellation of the policies. This causes a lot of inconvenience to the policy holders as there can be a delay in resolution of their request and the customer executives need to be contacted each time the policy holder wishes to upgrade his/her insurance policy, pull out a receipt for past premium payment, update his/her personal details.

Today, there are many insurance companies offering products in similar product lines, it therefore becomes essential for an organization to retain its existing policy holders and also attract new customers. To stay abreast in the competition, the insurance companies are constantly striving to introduce new schemes and increase customer delight.

Therefore, there is a need for a system which will enable insurance organizations to provide a single platform to the policy holders where they will have minimum dependence on customer support executives for updating personal details, upgrading the policy, retrieving past payments receipts, checking the latest NAV values, processing claims and the like. In addition, there is a need for system which can provide a single role based access to the entire insurance data for all stakeholders of the insurance system including insurers, brokers, agents and third party administrators, policy holders, franchisee and the like. Moreover, there is also a need for a system which provides insurers with a window for advertising their products by communicating directly with the customers.

OBJECTS OF THE INVENTION

It is an object of the present invention to provide a neutral, unbiased and lead generating system, without intervention, for the Insurance industry which includes insurance players like Insurers, Brokers, Agents and TPAs and beneficiaries like Corporate and Retail customers of Insurance.

It is another object of the present invention to provide an exchange mechanism for the Insurance industry where products and services of the providers can be exchanged with the customers of Insurance.

Still another object of the present invention is to provide a single user interface which integrates with the local and global insurance market system.

Yet another object of the present invention is to provide a standardized format for meeting both local and global insurance needs using a single local interface Further, still another object of the present invention is to introduce online insurance requisition services in Quote, Endorsement, Claim and Re-Insurance management under one roof termed as GIPSM (General Insurance Products Services Management) in General Insurance Further, yet another object of the present invention is to extend on the exact lines of GIPSM, requisition services in Quote, Endorsement and Claim management to Life insurance, Takaful insurance and Micro or Rural insurance.

One more object of the present invention is to provide an efficient customer-centric insurance exchange.

Still another object of the present invention is to provide a multi-lingual insurance exchange.

Yet another object of the present invention is to provide a secure multi-user insurance exchange.

An additional object of the present invention is to provide a low maintenance insurance exchange.

Another object of the present invention is to provide a versatile insurance exchange which can support multiple insurance products offered by various insurance organizations.

Furthermore, still another object of the present invention is to provide a versatile insurance exchange which can support services offered by various multiple entities like an Insurance company, an Insurance Broker, an Insurance Agent and an Insurance Third Party Administrator (TPA) for claims

SUMMARY OF INVENTION

The present invention envisages an insurance exchange system which provides insurance users with an integrated view of insurance products and services offered by various insurance organizations in various countries under a single customizable and search-capable interface. Specifically, users will be provided with a single platform for searching a country specific, product specific system for a Quote and/or Endorsement and/or Claims and/or Re-insurance requisition service or the like, based on user-chosen characteristics. Specifically, policy holders will get an aggregate view of the different policies available to them as well as the ones registered by them, which are provided by different insurance organizations, through a single insurance account.

The present invention envisages an integrated system for providing a neutral, unbiased and automated lead generating platform for insurance lifecycle processing, the system having a first repository adapted to store information relating to insurance products and services along with attributes which define pre-determined criteria, a search capable and customizable interface adapted to allow a user to search for the insurance products or the insurance services in accordance with pre-determined criteria, fetching means adapted to fetch information of stored insurance products and services in relation with requested criteria, a communication channel adapted to facilitate communication between a set of users and a set of providers and display means adapted to display an aggregated view of different insurance products and services fetched by the fetching means and quoted by the providers, the system characterized by a plurality of insurance units including quote management unit, endorsement unit and claims assistance which co-operate with the following components to facilitate in insurance lifecycle processing:

registration means adapted to register information pertaining to a user and the details of an insurance product associated with the user and further adapted to provide a unique transaction ID for the insurance product;

a second repository adapted to create a discrete workspace to store insurance lifecycle transaction details for the transaction ID;

requisition submission means adapted to allow a user to populate and submit a requisition for insurance products and insurance services spanning across the insurance lifecycle, wherein the transaction ID is submitted along with the requisition in the event that the requisition is for insurance services including endorsement and claim assistance;

notification means adapted to notify the requisition to a set of providers in order for them to process a response and further adapted to provide access to the details of the transaction ID in the event that the requisition is for insurance services including endorsement and claim assistance;

messaging means adapted to message the response to the user; and     storage facilitation means adapted to receive the requisition and its response and further adapted to append the requisition and the response in the workspace associated with the transaction ID.

Typically, the requisition comprises fields including questions, description, consequences, regulatory update, answer and upload arranged in a predetermined format.

Preferably, the communication channel facilitates communication between a set of users and a set of providers using "Insurance Trade Center" characterized in that the communication channel includes archiving means adapted to archive interaction between a set of users and a set of providers including their chat details along with IP address tracking details.

Further, the quote management unit includes:

premium calculation means adapted to generate an ideal threshold premium for a desired quote requisition to enable the user to perform comparative analysis and submit an Ask rate to said providers;

quote comparison means adapted to receive a set of Give rates as the response from a set of providers, the Ask rate and the ideal threshold premium and further adapted to collate and generate a comprehensive quote comparison report in a predetermined format showing discrete quote details received from said set of providers for display on the display means, in the event that the response is messaged to the user corresponding to a requisition submitted for quote procurement;

selection means adapted to enable the user to select a desired quote from the quote comparison report;

a payment interface adapted to enable the user to pay premium for the desired quote using a predetermined payment gateway; and     second registration means adapted to register the desired quote against the user's profile and further adapted to generate a unique transaction ID for the purchased insurance product corresponding to the desired quote and still further adapted to update the second repository with the transaction ID having the procurement and payment details.

Still further, the claims assistance unit includes redress means adapted to submit a transaction ID for raising discrepancies in a claim settlement process to an insurance regulator.

Furthermore, the system comprises editing means co-operating with the requisition submission means adapted to enable editing of the requisitions submitted by a user and vetting assistance means adapted to facilitate users to evaluate a quote procurement response and endorsements.

Moreover, the system comprises external interfacing means adapted to provide an interface to educational institutions to provide and publish insurance related information including live educative feeds, research updates, technical papers, insurance research reports on the display means.

In addition, the system includes a knowledge management unit to assist users in understanding insurance related terms, the knowledge management unit having an insurance dictionary and predesigned insurance certification programs.

Additionally, the system includes product management unit having training material including an insurance diary, an insurance directory and a guide for all insurance products to provide users education on the insurance products.

In accordance with the present invention, there is envisaged a method for providing a neutral, unbiased and automated lead generating platform for insurance lifecycle processing and to facilitate communication between a set of users and a set of providers, the method comprising the following steps:

creating a first repository for storing information related to insurance products and services along with attributes which define pre-determined criteria;

registering information pertaining to a user and the details of an insurance product associated with the user and providing a unique transaction ID for the insurance product;

providing a second repository to create a discrete workspace to store insurance lifecycle transaction details for the transaction ID;

providing a search capable and customizable interface to allow a user to search for the insurance products or the insurance services in accordance with pre-determined criteria;

fetching information of stored insurance products and services in relation with requested criteria;

enabling a user to populate and submit a requisition for insurance products and insurance services spanning across the insurance lifecycle;

notifying the requisition to a set of providers in order for them to process a response;

messaging the response to the user;

displaying an aggregated view of different insurance products and services fetched and quoted by the providers; and receiving the requisition and its response and further appending the requisition and the response in the workspace associated with the transaction ID.

In accordance with this invention, the step of enabling a user to populate and submit a requisition includes the step of submitting a transaction ID along with the requisition in the event that the requisition is for insurance services including endorsement and claim assistance.

Further, the step of notifying the requisition to a set of providers includes the step of providing access to the details of the transaction ID in the event that the requisition is for insurance services including endorsement and claim assistance.

Still further, the step of enabling a user to populate and submit a requisition for insurance products and insurance services includes the step of facilitating the user to vet and edit the requisition.

Furthermore, the step of messaging the response to the user includes the following steps:

generating an ideal threshold premium for a desired quote requisition to enable the user to perform comparative analysis and submit an ask rate;

receiving a set of Give rates as the response to the quote requisition;

receiving the ideal threshold premium, the set of Give rates and Ask rate and generating a comprehensive quote comparison report in a predetermined format showing discrete quote details received from said set of providers, in the event that the response is messaged to the user corresponding to a requisition submitted for quote procurement;

enabling the user to select a desired quote from the quote comparison report;

linking the user to a payment interface to enable payment of premium for the desired quote using a predetermined payment gateway; and registering the desired quote against the user's profile and generating a unique transaction ID for the purchased insurance product corresponding to the desired quote and further updating the second repository.

Typically, the method further comprises the steps of providing a communication channel to facilitate communication between a set of users and a set of providers and archiving the communication between the set of users and the set of providers including their chat details along with IP address tracking details.

Preferably, the method comprises the steps of providing external interfaces to:

educational institutions for providing and publishing insurance related information including live educative feeds, research updates, technical papers and insurance research reports; and insurance regulator for viewing online communication between the user and providers, viewing reports, communicating either singly or collectively with users and providers, passing regulatory guidelines, notifications and alerts and receiving complaints/feedbacks from users.

In addition, the method includes the steps of providing assistance to users in understanding insurance related terms and insurance products by:

highlighting and linking predetermined terms in requisitions and reports to an insurance dictionary;

providing predesigned insurance certification programs; and providing training on insurance products using an insurance diary, an insurance directory and a guide.

BRIEF DESCRIPTION OF DRAWINGS

The invention will now be described in relation to the accompanying drawings, in which.

DESCRIPTION OF THE INVENTION

The invention will now be described with reference to the accompanying drawings which do not limit the scope and ambit of the invention. The description provided is purely by way of example and illustration.

The present invention envisages an insurance lifecycle integrator which can be integrated into any type of Insurance namely General Insurance (Non-Life), Life Insurance, Takaful Insurance and Micro (Rural) Insurance.

The proposed insurance lifecycle integrator integrates all the exclusive services offered by units namely Quote Management Unit, Endorsement Unit, Claim Assistance Management Unit and Corporate Re-Insurance Management Unit by assigning a unique code namely a transaction ID.

The transaction ID tracks the minute details at each stage of an insurance product lifecycle namely Procurement stage, Endorsement stage and Claim Assistance stage which belong to the aforementioned units and wherein the tracked details of these stages can be retrieved at any point of time at the convenience of the user and the provider for the purpose of materializing the insurance purpose. Thereby, all the units are connected with a single unique code (transaction ID) giving a user the facility to track the lifecycle of insurance products from Quote Requisition stage till Claim Assistance stage.

The insurance lifecycle integrator follows a continuous linear flow of events ranging from Product Requisition→Product Purchase→Endorsement→Claim Assistance. The present invention enables a user to enter the system at any stage at any point of time within the life of purchased insurance product. The present invention enables the user to enter the system and fill in required information of the purchased insurance product at Endorsement stage. If the user joins at the claims assistance stage, the system enables the user to enter the required information about purchased policy and all relevant endorsements (if any) into the system.

In accordance with one aspect of this invention, in addition to the existing functions of the Quote Management Unit which comprise quote requisitions, sending timely alerts to the user and insurance provider and saving of the copy of the requisitions by the user, the present invention includes a Quote Comparison mechanism which enables selection of an optimal quote and purchase of the same through a payment gateway provided by the system. The quote comparison mechanism creates an efficient report optimally displaying the quotations received from various providers. The report gives the user an easy to understand yet comprehensive display of the quotations to arrive at a best quote and purchase the same. Additionally, when a user fills up a quote requisition form, the system generates an ideal threshold premium for the selected product. This enables the user to stick on to a likely outcome in the pricing on a scientific basis and also enables:

- a regulator to check the competitive pricing environment;
- the user to arrive at an ask rate (budget amount) and to do comparative analysis of different quotes by different providers like Insurers, Brokers and Agents; and
- the providers like Insurers, Brokers and Agents to arrive at a premium amount based on the comparative analysis between system generated threshold premium and the user ask rate (budget amount) along with a justification for the premium being quoted. The quote details are delivered to the user by way of SMS and the justification (wherever provided) is sent along with the quote details through mail.

In accordance with this invention, the natural progression after the purchase stage and before the Claim stage in any insurance product life-cycle is endorsement. Endorsement here refers to any alterations or changes in the purchased policy which is either material or non-material in nature which may change the outcome of an insurance product's assurances and commitments directly at the claim stage. The endorsements can be repeated any number of time for any purchased policy by the user any time till the renewal of the policy, in accordance with this invention. Here the unique code (transaction ID) is the source of information of the product purchased on which further alterations are made. And this information is upgraded and passed on to the next stage i.e., Claim Assistance Stage. At this stage of the insurance lifecycle, the unique code(transaction ID) comprises information of both Quote Management Unit and Endorsement Unit.

In accordance with yet another aspect of the present invention, the claim assistance unit comprises the functions of raising claim assistance requisitions, sending timely alerts to the user and Insurance Provider and saving of the copy of the requisitions by the user. Additionally, the present invention provides the user with a facility of submitting the unique code (transaction ID) to the concerned Insurer/provider (if applicable comprising Brokers, Agents and TPAs) from whom the product has been purchased along with the Claim Assistance form for consideration of claim.

In addition, the present invention also provides a redress system which provides the complaints about discrepancies typically in the claim settlement process to an insurance regulator. Using the redress system a user can directly submit the unique code (transaction ID) which contains information of both Quote Management Unit and Endorsement Unit of particular purchased Insurance product and Claim Management Unit in the form entire transaction history.

Moreover, along with integration of the exclusive units involved in an insurance lifecycle, the present invention provides users with features as follows:

- Edit feature for already sent quote and or claim requests to make changes for subsequent requests by the user;
- Vetting feature (Assistance) for the Proposal requisition form while Quote Procurement;
- Vetting feature (Assistance) for the Policy requisition form while any Endorsements;
- Feature of archiving the complete interaction between the user and insurance specialists including Insurers, Brokers and Agents while using "Insurance Trade Center" including chat details along with IP Tracking details;
- Feature of enabling participation of Universities and Schools of Excellence in promoting insurance education;
- Feature of integration of insurance regulator into the system to view online communication between the users, view repots, communicate with the users and receive suggestions and feedbacks as well as check the competitive pricing environment;
- Feature of integration of Knowledge Management subsystem to guide users across the system to comprehend Insurance related words/terms and its related meanings, materials and the like;
- Feature of integrating a Product Education System for the users; and
- Feature of enabling users to access the system using their mobile devices by providing a Mobile Application interface using WAP.

Figure 1:
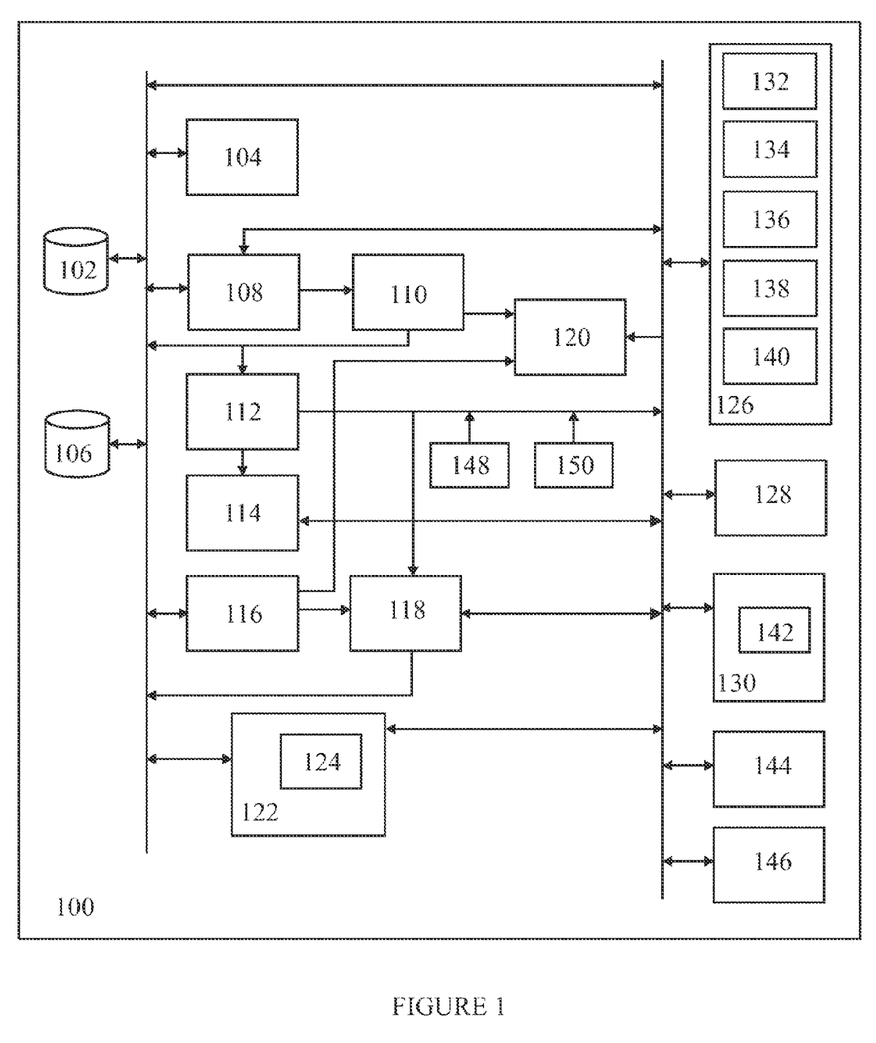
FIG. 1 illustrates a schematic of the insurance exchange system in accordance with the present invention.

Referring to the drawing, FIG. 1 shows the building blocks of an insurance exchange in accordance with the present invention. The system comprises a first repository 102 which stores information relating to insurance products and services along with attributes which define pre-determined criteria. These insurance products and services may belong to different providers and products related to different streams of insurances. Further, the system 100 includes registration means 104 which enables registration of information pertaining to a user and the details of insurance products associated with him/her. On successful registration the registration means 104 creates a user profile and provides a unique transaction ID to each of the insurance products registered by the user against his profile. The registration means 104 provides the system with the flexibility by allowing users to register themselves with the system at any point in the life of an insurance product, for instance, a user can register at the claims assistance stage wherein he will enter the details of the insurance product associated with him along with details of endorsements, if any performed prior to registration.

On registration of a user the system 100 creates a discrete workspace for the newly generated transaction ID in a second repository 106. The workspace enables capture and storage of all transactions that are performed on the insurance product for future retrieval and processing of services.

In addition, the system 100 comprises a search capable and customizable interface 108 which displays an interactive interface to users showing his/her current profile and allows the users to search for the insurance products or insurance services in accordance with pre-determined criteria. The system gives the users the facility to search for either new insurance products and services or existing products and services linked to his profile using this interface 108. The information of stored insurance products and services in relation with requested criteria from the first repository 102 is fetched by fetching means 110.

Moreover, the user can raise requisitions for the searched insurance products and services using requisition submission means 112. For instance, if a user searches for life insurance products and is interested in getting quotes from providers, the requisition submission means 112 enables the user to raise requisition proposal for the same.

The requisition submission means 112 allows a user to populate and submit a requisition form for insurance products and insurance services spanning across the insurance lifecycle, wherein the transaction ID is submitted along with the requisition in the event that the requisition is for insurance services including endorsement and claim assistance.

The requisition form in accordance with this invention, for any type of insurance product or service comprises question and answer fields and is applicable for quotes, endorsements and claims processing. Typically, the fields in a requisition form include:

Question: This field contains the question that is generally asked in any proposal form;
Description: This field contains the premise leading to the question field explained in detail and shown below the question;
Consequences: This field contains the do's and don'ts along with case studies accompanied with facts and figures showcasing as how not complying with a certain question asked has repercussions with regards to claims in the past;
Regulatory Update: This field contains the URL link to the regulatory authority's website where updates or changes regarding the question in the question field have been posted (typically shown below the question, if any)
Answer field: This field contains the answer that the user has to provide in the description box. All answers are MANDATORY (to be shown beside question). The answers field can be a text field, a number field, a date field, a browse button field and the like depending on the type of question being asked; and
Upload: This field contains an attachment facility for uploading a file whether in .jpg, .xls, .doc, .pdf, .gif, .zip formats.

The filled requisition form is given to notification means 114 which notifies the requisition and provides access to the transaction ID, if attached to the requisition, to a set of providers in order for them to process a response. The transaction ID enables the provider to view the complete history of the insurance product and this is particularly useful for claims processing whereby the provider can see the endorsements and based on the same process the claims raised in the requisition.

The response and quotes formulated by the providers are forwarded to the user via messaging means 116. The requisition along with the response is stored in the second repository 106 in a workspace associated with the transaction ID by storage facilitation means 118.

The system further includes a communication channel 122 to facilitate communication between a set of users and a set of providers using "Insurance Trade Center". The communication channel 122 includes archiving means 124 for archiving of the complete interaction between a set of users and a set of providers including their chat details along with IP address tracking details. The archived details are stored in the second repository 106 against the profile of a user participating in the chat.

Still further, the system 100 includes display means 120 to display an aggregated view of different insurance products and services fetched by the fetching means 110 and response messaged/quoted by the providers.

Thus, the transaction ID links the units involved in an insurance lifecycle namely the quote management unit, the endorsement unit and the claims assistance unit. The integration of these units via a transaction ID brings easy dissemination of insurance product information to a provider as well as makes processing of insurance services faster.

In addition to the above components, the system 100 also includes a plurality of units including quote management unit 126, endorsement unit 128 and claims assistance unit 130 which co-operate with the interface 108, the first repository 102, the second repository 106, the requisition submission means 112, the notification means 114, the messaging means 116, the storage facilitation means 118 and the display means 120 to facilitate in insurance lifecycle processing. Each of these units and their detailed operation and functions are explained hereinafter.

Quote Management Unit

Typically, the quote management unit 126 is involved in facilitating users to raise quote requisitions, send alerts to the user and the insurance provider and save a copy of the requisition sent by the user. The present invention in addition to these functions of the quote management unit 126 proposes a quote comparison mechanism which enables selection and purchase of optimal quote through a payment gateway provided by the system. After the user fills the requisition for quote procurement and submits it via requisition submission means 112 to a set of providers, the providers in their response, message their quotes which are then accessed by the quote management unit 126. The entire process of quote procurement to purchase performed by the quote management unit 126 is explained in detail herein below:

In accordance with this invention, upon the successful filling up of the quote requisition form for any insurance product under any insurance stream namely Life, Non-Life, Takaful or Micro insurance, a premium calculation means 136 of the quote management unit 126 generates an ideal threshold premium based on the formulae accepted by an Insurance Regulator of a country to enable users to perform comparative analysis. In addition, the premium calculation means 136 enables the user to stick on to a likely outcome in the pricing on a scientific basis and publishes this threshold premium to enable:

the regulator to check the competitive pricing environment;
the user to arrive at an ask rate(budget amount) and to do comparative analysis of different quotes by different providers like Insurers, Brokers and Agents; and the providers like Insurers, Brokers and Agents to arrive at a premium amount based on the comparative analysis between system generated threshold premium and the User ask rate (budget amount). On the basis of the threshold premium the providers can give a justification for the premium they quote. The quote details are delivered to the user by the provider by way of SMS and the justification (wherever provided) is intimated along with the quote details through mail.

The ideal threshold premium is only calculated for a benchmark pricing and made available to both the user and the provider whom the user is going to select. This ideal threshold premium enables the user to understand well in advance the probable premium that can be charged which may or may not fall within the vicinity of the ideal premium when received as premium quotes from the selected providers namely insurers, brokers and agents.

The ideal threshold premium also enables the selected providers to know in advance the benchmark price of the premium in an ideal situation. This also enables the providers to interrogate risk perception and provide their own premiums which may or may not coincide with the ideal premium.

Moreover, the ideal threshold premium gives the user the opportunity to visualize the range of premium expected and provide an opportunity to submit an Ask rate to the providers namely insurers, brokers and agents for a premium possibly matching to the budget available in the requisition form. Other advantages of generation of an ideal threshold premium include ensuring that the user understands the necessity of an accurate premium for a better claim paying capability by the insurer and it also prepares the user for a possible cut in insurance add on coverage or increase in exclusions or increase in warranties matching to the conservative Ask rate.

The user may select a provider of his/her choice for submitting his Ask rate via a quote requisition form. This requisition for a desired ask rate either directly reaches an insurer for a premium quote or directly reaches Brokers for a premium quote or directly reaches agents for a premium quote or directly reaches an insurer from a Broker/Agent who was selected and assigned the job by the user or directly reaches an insurer from a Broker who may have received it from an Agent who was selected and assigned the job by the user.

Upon receiving the ask rate via the notification means 114, the insurer/provider arrives at a Give rate in one/more ways as follows:
 a Give rate totally independent and exclusive;
 a Give rate in consultation with an Agent who was assigned the Job by the user; and
 a Give rate in consultation with a Broker who was assigned the Job by the user.

This ensures that the insurer never makes underwriting losses and is always honest with a justification for a Give rate falling under any one of the above three scenarios. The give rate is messaged to the user as a response to the quote requisition by the messaging means 112.

Upon receiving the Give rate as response and the Ideal threshold Premium, the Ask rate is compared for the premium quote prices, coverage, warranties, exclusions and add-ons by quote comparison means 132. The quote comparison means 132 collates the details as mentioned above and generates a comprehensive quote comparison report in a predetermined format showing discrete quote details received from the set of providers for display on the display means 120 for analysis and conclusion of a user.

The quote comparison report is a comparison sheet that is helpful for the user to read, understand and evaluate the various quotations that are submitted for a single quote proposal.

In accordance with this invention, quote comparison report divided into a plurality of sections to show details associated with an insurance product quote including benefit chart, the inclusions, the exclusions and the add-ons. The quote comparison report is easily readable and is in a simple format. The quote management unit 126 further includes a selection means 134 which enables a user to select a desired quote from the report. The quote comparison report does not in any way pass a comment or recommend any provider (Insurer, Broker, Agent and TPA) but is useful for the users as it conveys an overall picture of the quotes requisition submitted.

Furthermore, on selecting the desired quote based on the threshold premium and then based on the actual Give rate the user can pay premium for the desired quote using a predetermined payment gateway via a payment interface 138.

On purchase of an insurance product, the quote management unit 126 forwards the details to second registration means 140 which then registers the insurance product against the user's profile and further generates a unique transaction ID for the purchased insurance product corresponding to the desired quote and still further updates the Transaction ID with the details of procurement and stores the updated transaction ID in the second repository 106.

Endorsement Unit

The Endorsement unit 128 falls after the utilization of Quote Management Unit 126 and before the activation of Claim Assistance Unit 130.

In accordance with this invention, endorsements can be repeated any number of times for any purchased policy by the user, any time till the renewal of the policy. The endorsement unit 128 utilizes the transaction ID as the source of information of the product purchased on which further alterations are to be made. The requisitions raised for endorsements and the response from the providers and any further updates are appended to the transaction ID. And this information is upgraded and passed on to the next stage that is, claim assistance stage.

When a requisition is raised for endorsement, requisition submission means 112 along with the requisition attaches the transaction ID of the insurance product and automatically submits the endorsement form to a previously selected insurer or provider (if applicable comprising Brokers, Agents and TPAs). The notification means 114 alerts the concerned Insurer and provider (if applicable comprising Brokers, Agents and TPAs) through mobile and web technologies which completes the process of Endorsement Management from the side of a user.

The system enables the receivers of such Endorsement form to act on the necessary alterations/changes and also acknowledgement receipt of such Endorsement form via the messaging means 118. The cycle of endorsement completes with the physical delivery of Endorsement form by the Insurer/provider (if any) which falls outside the scope of the present invention.

At this stage, the transaction ID comprises information of both Quote Management Unit 126 and Endorsement Unit 128.

Claims Assistance Unit

The claims assistance unit 130 facilitates the functions of claim requisitions, providing timely alerts to the users and insurance providers and saving of the copy of the requisitions by the user.

In addition to these functions, the claims assistance unit 130 provides a user with a facility of submitting the transaction ID to the concerned insurer/provider (if applicable comprising Brokers, Agents and TPAs) from whom the product has been purchased along with the claim assistance requisition for consideration of claim. Thus, this enables the concerned insurer/provider to view the entire history of the purchased insurance product.

The claims assistance unit 130 also provides redress means 142 to submit a transaction ID associated with an insurance product for raising discrepancies in a claim settlement process to an insurance regulator.

Further to the units that facilitate insurance lifecycle processing, the present invention includes a knowledge management unit 144 to assist users in understanding insurance related terms. The knowledge management unit 144 further comprises an insurance dictionary and predesigned insurance certification programs for users.

This unit exclusively deals with Insurance knowledge comprising of Insurance Directory which has insurance related words/terms and its related meanings and related materials. The present invention in every requisition form creates links or highlights terms whose meaning is to be comprehended. These highlighted words and links are diverted to the knowledge management unit 144 and access the insurance dictionary to explain the term to the user.

The system further includes product management unit 146 which gives access to training material including an insurance diary, an insurance directory and a guide for all insurance products to provide users education on the insurance products. The unit also provides users with related circulars from the Insurance Regulator.

The product management unit 146 gives the users basic education on the Insurance products including the terminology, the coverage, inclusions and exclusions and is further refined with the knowledge already available on different systems. The unit also introduces the users to the products and thereby increasing the latent demand.

The benefits of the product management unit 146 that are expected to enrich the providers include:
- eliminating the overhead of educating the customers about the different insurance products; and
- the benefit to invest the reduced training time in planning and building expertise to take the services to the next level.

Additionally, the system comprises editing means 148 which co-operates with the requisition submission means 112 to enable editing of the requisitions submitted by a user to a set of providers. For instance, for a quote requisition, the editing means 148 enables a user to update the ask rate on an already notified requisition. The system handles the editing by generating a notification for the provider alerting them on the update to the received requisitions.

Also, the system comprises vetting assistance means 150 to facilitate users to evaluate a quote procurement response and endorsements. External interfacing means (not shown in the figure) is included in the system which provides an external interface to Educational Institutions as well as to an insurance regulator.

The external interfacing means facilitates the participation of universities and schools of excellence in promoting insurance education. The external interfacing means supports educative feeds, research updates and technical papers directly from Universities and Schools of Excellence to participate through a free—knowledge share scheme. The student's name, university and the course details are archived and displayed by the external interfacing means and also reported is the benefit from the research to all the elements of the ecosystem. For the same, the University or School of Excellence is provided with a free login.

The external interfacing means also enables an insurance regulator to oversee the system operations via an external interface. The insurance regulator can perform the following functions via the external interface:
- View online communication between the user and providers namely Insurers, Brokers and Agents at any point of time;
- View Reports like quote comparison report;
- Communicate either singly or collectively with users, providers namely Insurers, Brokers and Agents for passing regulatory guidelines, notifications, alerts and the like; and
- Receive suggestions and complaints from the users and providers namely Insurers, Brokers and Agents.

The system also enables the various stakeholders of the system namely the users and providers to access the system through their wireless handheld devices through a mobile application developed using WAP Services. The mobile application enables the users to avail services of units including Quote Management Unit, Endorsement, Claims Assistance Management Unit, Corporate Re-Insurance Management Unit and additional services like 4Expert Search, Mobile payment gateway integration via this application.

Figure 2:
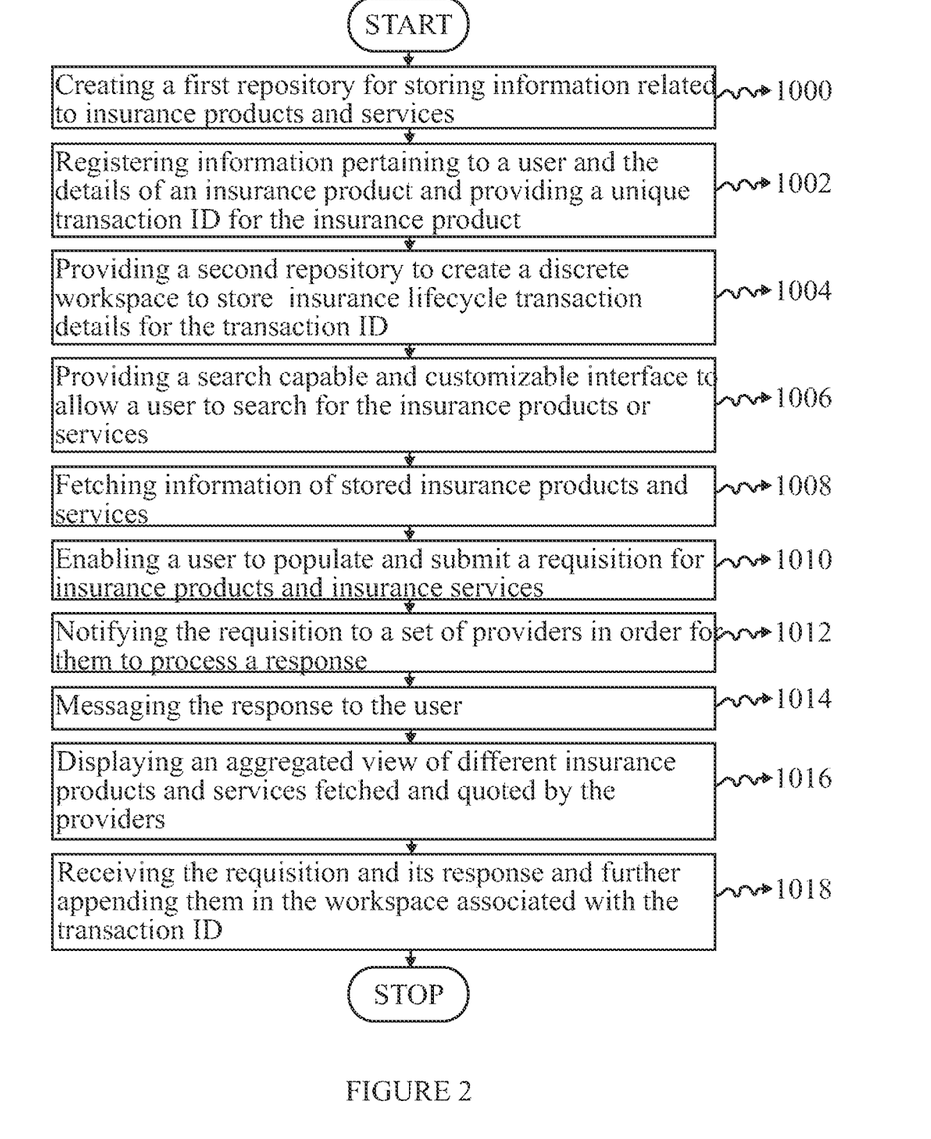
FIG. 2 is a flowchart showing the steps for providing a neutral, unbiased and automated lead generating platform for insurance lifecycle processing in accordance with the present invention.

In accordance with the present invention, there is envisaged a method for providing a neutral, unbiased and automated lead generating platform for insurance lifecycle processing, the method comprising the following steps as seen in FIG. 2:
- creating a first repository for storing information related to insurance products and services along with attributes which define pre-determined criteria, 1000;
- registering information pertaining to a user and the details of an insurance product associated with the user and providing a unique transaction ID for the insurance product, 1002;
- providing a second repository to create a discrete workspace to store insurance lifecycle transaction details for the transaction ID, 1004;
- providing a search capable and customizable interface to allow a user to search for the insurance products or the insurance services in accordance with pre-determined criteria, 1006;
- fetching information of stored insurance products and services in relation with requested criteria, 1008;
- enabling a user to populate and submit a requisition for insurance products and insurance services spanning across the insurance lifecycle, 1010;
- notifying the requisition to a set of providers in order for them to process a response, 1012;
- messaging the response to the user, 1014;
- displaying an aggregated view of different insurance products and services fetched and quoted by the providers, 1016; and
- receiving the requisition and its response and further appending the requisition and the response in the workspace associated with the transaction ID, 1018.

In accordance with this invention, the step of enabling a user to populate and submit a requisition includes the step of submitting a transaction ID along with the requisition in the event that the requisition is for insurance services including endorsement and claim assistance.

Further, the step of notifying the requisition to a set of providers includes the step of providing access to the details of the transaction ID in the event that the requisition is for insurance services including endorsement and claim assistance.

Still further, the step of enabling a user to populate and submit a requisition for insurance products and insurance services includes the step of facilitating the user to vet and edit the requisition.

Furthermore, the step of messaging the response to the user includes the following steps:
- generating an ideal threshold premium for a desired quote requisition to enable the user to perform comparative analysis and submit an ask rate;
- receiving a set of Give rates as the response to the quote requisition;
- receiving the ideal threshold premium, the set of Give rates and Ask rate and generating a comprehensive quote comparison report in a predetermined format showing discrete quote details received from said set of providers, in the event that the response is messaged to the user corresponding to a requisition submitted for quote procurement;
- enabling the user to select a desired quote from the quote comparison report;
- linking the user to a payment interface to enable payment of premium for the desired quote using a predetermined payment gateway; and
- registering the desired quote against the user's profile and generating a unique transaction ID for the purchased insurance product corresponding to the desired quote and further updating the second repository.

Typically, the method further comprises the steps of providing a communication channel to facilitate communication between a set of users and a set of providers and archiving the communication between the set of users and the set of providers including their chat details along with IP address tracking details.

Preferably, the method comprises the steps of providing external interfaces to:
- educational institutions to provide and publish insurance related information including live educative feeds, research updates, technical papers, insurance research reports; and
- insurance regulator to view online communication between the user and providers, view reports, communicate either singly or collectively with users and providers, passing regulatory guidelines, notifications and alerts and receive complaints/feedbacks from users.

In addition, the method includes the steps of providing assistance to users in understanding insurance related terms and insurance products by:
- highlighting and linking predetermined terms in requisitions and reports to an insurance dictionary;
- providing predesigned insurance certification programs; and
- providing training on insurance products using an insurance diary, an insurance directory and a guide.

Technical Advantages

The technical advantages of the present invention include in providing a neutral, unbiased and automated lead generating platform for interaction, relating to insurance products and services, between a set of users and a set of providers.

The system enables a user to access his insurance products and services which are availed from different vendors through a single interface. The system enables the users of the system to customize their interface by selecting the currency and language of their choice.

The system generates a unique code in the form of a transaction ID to capture minute details of an insurance product, thus making tracking and retrieval of information at any point of time easy and prompt. The transaction ID reduces the processing and communication overheads on providers during endorsement processing and claims processing as they can see the entire history of an insurance product and accelerate the respective processes.

Further, the system is flexible and enables a user to enroll/register with the system at any time within the life of the insurance product.

Still further, the present invention provides means to redress complaints by raising discrepancies typically, in the claims processing service to an Insurance regulator. The system also enables the insurance regulator to view the communication between the user and the providers and facilitate communication with individual or a group of user and/or providers. Thus, the present invention ensures that the proposed system is under the guidance and control of the nation's Insurance Regulator to regulate the trade of products and services based on its rules and regulations.

Furthermore, the present invention enables integration of knowledge management system which enables users to get access to insurance dictionary for understanding terms pertaining to insurance.

In addition, the present invention provides the user with a quote comparison mechanism which enables them to understand the details of various quotations by means of a simple report which is divided into sections like the benefit chart, the inclusions, the exclusions and add-ons. The sheet enables the user to select an optimum insurance product and thereafter the present invention enables the user to make payment for the same via a secure interface. The system also generates an ideal threshold premium for a selected insurance product to enable a user anticipate the premium of an insurance product. This threshold premium also enables an insurance regulator to checking the pricing environment and providers to decide on a ask rate for a product as well as provide justification for the ask rate.

Moreover, the system enables the user to edit quotes/claim requests and enables vetting of quote procurements and endorsements.

The proposed system also archives all the interactions which between users using the Insurance Trade Center.

The present invention also facilitates access to the system using mobile/wireless technologies. An interface is also provided to Universities and School of Excellence to promote insurance education.

Thus, the present invention reduces overhead in processing of insurance services and enables the user to interact with players in the insurance industry and avail prompt processing of their requisitions through an integrated customizable interface. Also, the present invention provides a one-stop shop for any insurance plan which can be life, non-life, takaful or micro, facilitates in comparing benefits and prices and enables the users to choose the plan that's best for them.

While considerable emphasis has been placed herein on the particular features of this invention, it will be appreciated that various modifications can be made, and that many changes can be made in the preferred embodiments without departing from the principles of the invention. These and other modifications in the nature of the invention or the preferred embodiments will be apparent to those skilled in the art from the disclosure herein, whereby it is to be distinctly understood that the foregoing descriptive matter is to be interpreted merely as illustrative of the invention and not as a limitation.

What is claimed is:

1. An integrated system for providing a neutral, unbiased and automated lead generating platform for insurance lifecycle processing, said system comprising:
   a first repository adapted to store information relating to insurance products and services along with attributes which define pre-determined criteria;
   a search capable and customizable interface (SCCI) adapted to allow a user to search for said insurance products or said insurance services in accordance with pre-determined criteria;
   a communication channel adapted to facilitate communication between a set of users and a set of providers;
   a computer processor operatively connected to the first repository, the SCCI, and the communication channel and configured to:
      fetch information of stored insurance products and services in relation with requested criteria;
      display an aggregated view of different insurance products and services fetched by said fetching means and quoted by said providers;
      register information pertaining to a user and the details of an insurance product associated with the user and further adapted to provide a unique transaction ID for said insurance product;
      allow a user to populate and submit a requisition for insurance products and insurance services spanning across the insurance lifecycle, wherein said transaction ID is submitted along with said requisition in the event that the requisition is for insurance services including endorsement and claim assistance;
      notify said requisition to a set of providers in order for them to process a response and further adapted to provide access to the details of said transaction ID in the event that the requisition is for insurance services including endorsement and claim assistance;
      message said response to said user;
      receive said requisition and its response and further adapted to append said requisition and said response in said workspace associated with said transaction ID; and
   a second repository operatively connected to the computer processor and adapted to create a discrete workspace to store insurance lifecycle transaction details for said transaction ID; and
   a plurality of insurance units including quote management unit, endorsement unit and claims assistance unit co-operating with said SCCI, said first repository, said second repository, and said computer processor to facilitate in insurance lifecycle processing.

2. The system as claimed in claim 1, wherein said requisition includes fields including questions, description, consequences, regulatory update, answer and upload arranged in a predetermined format.

3. The system as claimed in claim 1, wherein said communication channel facilitates communication between a set of users and a set of providers using "Insurance Trade Center" characterized in that said communication channel is configured to archive interaction between a set of users and a set of providers including their chat details along with IP address tracking details.

4. The system as claimed in claim 1, wherein said quote management unit is configured to:
   generate an ideal threshold premium for a desired quote requisition to enable said user to perform comparative analysis and submit an Ask rate to said providers;
   to receive a set of Give rates as said response from a set of providers, said Ask rate and said ideal threshold premium and further configured to collate and generate a comprehensive quote comparison report in a predetermined format showing discrete quote details received from said set of providers for display, in the event that said response is messaged to said user corresponding to a requisition submitted for quote procurement;
   enable said user to select a desired quote from said quote comparison report;
   enable said user to pay premium for said desired quote using a predetermined payment gateway; and
   register said desired quote against said user's profile and further configured to generate a unique transaction ID for the purchased insurance product corresponding to said desired quote and still further adapted to update said second repository.

5. The system as claimed in claim 1, wherein said claims assistance unit is configured to submit a transaction ID for raising discrepancies in a claim settlement process to an insurance regulator.

6. The system as claimed in claim 1, wherein said computer processor is further configured to enable editing of said requisitions submitted by a user.

7. The system as claimed in claim 1, wherein said computer processor is further configured to facilitate users to evaluate a quote procurement response and endorsements.

8. The system as claimed in claim 1, wherein said computer processor is further configured to provide an interface to educational institutions to provide and publish insurance related information including live educative feeds, research updates, technical papers, insurance research reports.

9. The system as claimed in claim 1, wherein said system includes a knowledge management unit to assist users in understanding insurance related terms, said knowledge management unit having an insurance dictionary and predesigned insurance certification programs.

10. The system as claimed in claim 1, wherein said system includes product management unit having training material including an insurance diary, an insurance directory and a guide for all insurance products to provide users education on the insurance products.

11. A method for providing a neutral, unbiased and automated lead generating platform for insurance lifecycle processing, said method comprising:
   creating a first repository for storing information related to insurance products and services along with attributes which define pre-determined criteria;
   registering information pertaining to a user and the details of an insurance product associated with the user and providing a unique transaction ID for said insurance product;
   providing a second repository to create a discrete workspace to store insurance lifecycle transaction details for said transaction ID;
   providing a search capable and customizable interface to allow a user to search for said insurance products or said insurance services in accordance with pre-determined criteria;
   fetching, by a computer processor, information of stored insurance products and services in relation with requested criteria;

enabling a user to populate and submit a requisition for insurance products and insurance services spanning across the insurance lifecycle;

notifying, by the computer processor, said requisition to a set of providers in order for them to process a response;

messaging, by the computer processor, said response to said user;

displaying, by the computer processor, an aggregated view of different insurance products and services fetched and quoted by said providers; and receiving said requisition and its response and further appending said requisition and said response in said workspace associated with said transaction ID.

12. The method as claimed in claim 11, wherein the step of enabling a user to populate and submit a requisition includes the step of submitting a transaction ID along with said requisition in the event that the requisition is for insurance services including endorsement and claim assistance.

13. The method as claimed in claim 11, wherein the step of notifying said requisition to a set of providers includes the step of providing access to the details of said transaction ID in the event that the requisition is for insurance services including endorsement and claim assistance.

14. The method as claimed in claim 11, wherein the step of enabling a user to populate and submit a requisition for insurance products and insurance services includes the step of facilitating the user to vet and edit the requisition.

15. The method as claimed in claim 11, wherein the step of messaging said response to said user includes the following steps:

generating an ideal threshold premium for a desired quote requisition to enable said user to perform comparative analysis and submit an ask rate;

receiving a set of Give rates as said response to said quote requisition;

receiving said ideal threshold premium, said set of Give rates and Ask rate and generating a comprehensive quote comparison report in a predetermined format showing discrete quote details received from said set of providers, in the event that said response is messaged to said user corresponding to a requisition submitted for quote procurement;

enabling said user to select a desired quote from said quote comparison report;

linking said user to a payment interface to enable payment of premium for said desired quote using a predetermined payment gateway; and registering said desired quote against the user's profile and generating a unique transaction ID for the purchased insurance product corresponding to said desired quote and further updating said second repository.

16. The method as claimed in claim 11, wherein the method further comprises the steps of providing a communication channel to facilitate communication between a set of users and a set of providers and archiving said communication between said set of users and said set of providers including their chat details along with IP address tracking details.

17. The method as claimed in claim 11, wherein the method still further comprises the steps of providing external interfaces to:

educational institutions to provide and publish insurance related information including live educative feeds, research updates, technical papers, insurance research reports; and insurance regulator to view online communication between the user and providers, view reports, communicate either singly or collectively with users and providers, passing regulatory guidelines, notifications and alerts and receive complaints/feedbacks from users.

18. The method as claimed in claim 11, wherein the method includes the steps of providing assistance to users in understanding insurance related terms and insurance products by:

highlighting and linking predetermined terms in requisitions and reports to an insurance dictionary;

providing predesigned insurance certification programs; and providing training on insurance products using an insurance diary, an insurance directory and a guide.

* * * * *